Patented Oct. 23, 1934

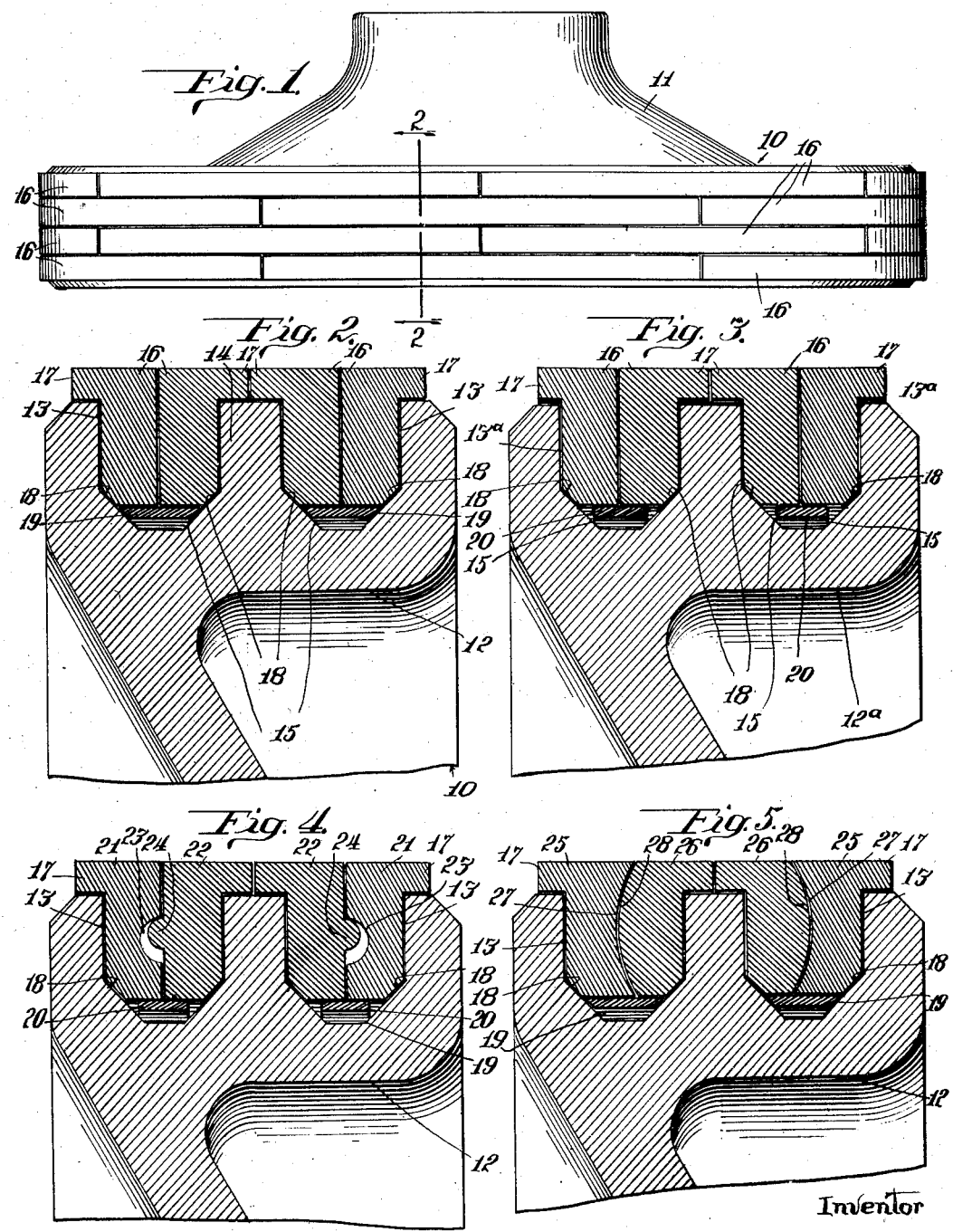

1,978,370

UNITED STATES PATENT OFFICE 1,978,370

PISTON CONSTRUCTION

Henry E. Muchnic, Atchison, Kans., assignor to The Locomotive Finished Material Company, Atchison, Kans., a corporation of Kansas Application August 17, 1932, Serial No. 629,146

5 Claims. (Cl. 309—29)

My invention relates to the construction and mounting of the piston and the piston rings in association therewith and with expanding or ring distending means; the invention also involving constructions wherein the ring distending means are free to move in relation to the rings and the piston and wherein said distending means may or may not be subjected to or made to carry the weight of the piston when used in horizontally disposed or non-vertical cylinders.

The invention also involves constructions wherein the rings are composed of a plurality of segments, with complemental segments arranged in parallel, side contacting and interlocking relation so as to induce or maintain a uniform distended condition of all of the segments of a ring group or unit.

The objects and advantages of my invention will all be fully comprehended from the following detailed description of the drawing, wherein:

Figure 1 is a peripheral side view of a piston involving my invention.

Figure 2 is a cross sectional view taken for example on the line 2—2 of Figure 1.

Figure 3 is a similar cross sectional view showing a modification.

Figure 4 is a similar sectional view disclosing a further modification.

Figure 5 is a similar cross sectional view of a further modified form.

For purposes of exemplification, I have chosen to illustrate my invention in connection with what is termed as a two-ring unit or type of piston, although it will be understood that any number of ring units may be employed; the piston 10 being provided with a hub portion, as at 11, for connection to the piston rod not shown.

In the particular exemplification shown in Figure 2, the peripheral portion 12 of the piston is provided with a pair of parallelly arranged and spaced apart circumferential channels 13, 13, providing an intervening wall portion 14 therebetween.

The side walls at the bottoms of the channels are converged, as for example in the manner shown at 15, thereby reducing the transverse dimensions of the channels at the bottoms.

The rings consist of a suitable number of complemental segments 16 of any predetermined length which in Figure 2 are of similar construction provided with the peripheral flanges or lips 17 disposed laterally on one side of the segments, thus permitting opposite sides of the complemental segments to extend flush with each other. The lips 17 overhang the wall portions of the piston and with the main part of the segments provide comparatively wide cylinder wall contacting surfaces.

The lower peripheral edges of the segments on the outer or lip sides thereof are cut away or beveled as at 18 so as to conform with the tapered or converged wall 15 of the channel at a distance above the bottom of the channel 13 and thereby provide a pocket or space in the lower end of the channel, beneath the lower surfaces of the complemental segments, in which the expanding ring 19 is located.

In the construction shown in Figure 2, the expanding rings 19 (one in each channel) are shown co-extensive with the width of the tapered portions of the channels and the opposite sides or perimeters of the rings are beveled in keeping with the tapered sides of the channels, thus allowing the expanding rings, in contracted condition, to seat in the channel as shown in Figure 2, wherein the piston rings and expanding rings are illustrated in a maximum contracted condition, namely a condition which might obtain at the lower side of a horizontally disposed piston where the weight is entirely carried by the packing rings.

When the ring assembly is in the condition shown, the lips 17 may or may not be entirely seated on the peripheral wall of the piston.

In Figure 3 I illustrate a modified form, wherein the complemental ring segments are of the same construction as shown in Figure 2, while the channels 13ª in the piston 12ª are of lesser depth and thus cause the lips 17 to remain in greater spaced relation with the wall of the piston. The lower peripheral outer sides of the segments are beveled at 18 to correspond with the tapered side 15 of the channel, like in Figure 2. In the construction shown in Figure 3, the expanding ring 20 is shown narrower in width than the tapered or converged portions of the channels and as a result the contracting movement of the expanding ring 20 is not limited. The expanding springs or rings 20 are of such width, however, that they will at all times contact with the bottoms of the parallelly arranged complemental segments, even though the expanding rings did shift toward either side of the channel.

The construction in Figure 3 also shows the rings in maximum contracted condition, namely a condition possible at the lower side of a horizontally disposed piston where the lower segments are compelled to carry the weight of the piston.

In Figure 4 I disclose the piston 12 provided with channels 13 of depth similar to those shown in Figure 2; and with the bottoms of the channels provided with expanding rings 20 similar to that shown in Figure 3.

The rings, like in the previously described constructions, consist of complemental segments 21 and 22, beveled at their lower outer perimeters 18 to conform with the tapered sides at the bottoms of the channels. One of the segments, for example segment 21, is shown provided with a groove or socket 23, in the side wall which contacts with segment 22, adapted to receive the protruding rib or lug 24 on the complemental segments 22. The groove or socket 23 is shown of width somewhat greater than the width of the rib or lug 24 and both socket and lug are preferably made arcuate as shown, to permit easy assembly of the complemental segments. The sockets 23 and the lugs 24 provide an interlocking condition between the complemental segments which causes them to move radially outward in unison. The sockets 23 and lugs 24 may extend throughout the lengths of the respective segments; or may be located intermediate of the ends of the respective segments at any preselected point on the abutting sides of the complemental segments and thus provide means whereby the complemental segments may be locked in the staggered relation, shown in Figure 1, namely with the abutting ends of segments 21 circumferentially spaced from the abutting ends of segments 22.

In Figure 5 the piston 12 is provided with channels 13 like in Figure 2, having the tapered sides at the bottom and expanding rings 19 like in Figure 2, with the beveled sides. The rings consist of the complemental segments 25 and 26 having lips 17 and lower beveled edges 18 like in the previously described constructions. In this construction the complemental segments are interlocked against independent radial movement by dishing or concaving the side of one segment, for example segment 25 as at 27; while the adjacent side of segment 26 is made with an arcuate bulge 28, matching the concavity in the side of segment 25.

I have disclosed specific embodiments of my invention which have been described in terms employed merely for purposes of description and not as terms of limitation, as structural modifications may be made without, however, departing from the spirit of my invention as defined by the following claims.

What I claim is:

1. In a piston construction, a piston head provided with a circumferential channel in its periphery, the side walls of the channel at a distance above the bottom of the channel being tapered toward each other; a packing ring disposed in the channel and composed of complemental segments whose lower outer side edges conform with the tapered side walls of the channel at a distance removed from the bottom of the channel; and a resilient element disposed in the channel beneath said side wall seating portions whereby the packing ring segments are yieldingly moved radially.

2. In a piston construction, a piston head provided with a circumferential channel in its periphery, said channel at a distance from the bottom, having converged side walls; a packing ring disposed in said channel with the outer perimeter extending beyond the periphery of the head and composed of circumferential rows of segments arranged in contacting relation, the contacting sides of segments in adjacent rows having interengaging surfaces whereby the segments of adjacent rows are caused to move together, the lower edges of the segments on their outer sides being beveled to conform with the upper portion of the converged sides of the channel above the bottom of the channel; and a resilient ring located in the channel beneath the lower surfaces of the segments.

3. In a piston construction, a piston head provided with a circumferential channel in its periphery, said channel having converging surfaces intermediate its base and its side walls; a packing ring disposed in said channel composed of circumferential rows of staggered segments arranged in side to side relationship, said ring segments at their inner perimeters having converging surfaces corresponding with the converged surfaces of the channel; a spring member between the base of said channel and said packing ring whereby the segments are made to move in unison, the combined depth (i. e. radial thickness) of said ring and said spring exceeding the depth of said channel and wherein the depth of the converged lower portion of said channel does not exceed the depth from the base of said channel to the portion of the ring of maximum thickness above said converged surfaces, with said spring contacting said ring and being compressed in said channel.

4. In a piston construction, a piston head provided with a circumferential channel in its periphery having converging surfaces intermediate of its base and its side walls; a packing ring in said channel composed of circumferential rows of staggered segments arranged in side to side relationship and contoured complementary to the side walls of the channel; a spring member between the base of said channel and said packing ring, the combined depth (i. e. radial thickness) of said ring and said spring exceeding the depth of said channel, so that the piston at no time contacts with the cylinder walls.

5. In a piston construction, a piston head provided with a circumferential channel in its outer periphery, the side walls of said channel having substantially parallel portions adjacent the outer periphery of the piston and other portions converging toward each other at the bottom of said channel; a packing ring disposed in said channel comprising a plurality of rows of segments arranged in staggered relation with respect to each other, the sides of the segments adjacent the side walls of said channel having surfaces complemental to both portions of said side walls; and an expander disposed in said channel intermediate the inner periphery of said ring and the bottom wall of said channel, said expander being positioned in substantially centralized relation with respect to said ring segments by the converging portions of said side walls.

HENRY E. MUCHNIC.